United States Patent [19]

Kolosov

[11] 4,049,329
[45] Sept. 20, 1977

[54] AUTOMATIC DEVICE FOR MAINTAINING THE LEVEL OF A STACK OF PLATES

[76] Inventor: Ivan Alexandrovich Kolosov, ulitsa Astrakhanskaya, 118, kv. 54, Saratov, U.S.S.R.

[21] Appl. No.: 721,709

[22] Filed: Sept. 9, 1976

[30] Foreign Application Priority Data

Sept. 10, 1975 U.S.S.R. .............................. 2172467

[51] Int. Cl.² .............................................. A47F 1/00
[52] U.S. Cl. ...................................... 312/71; 312/50; 211/49 D
[58] Field of Search ............................ 312/71, 50, 42; 211/49 D

[56] References Cited

U.S. PATENT DOCUMENTS

| 1,833,292 | 11/1931 | Krick | 312/71 |
|---|---|---|---|
| 2,479,396 | 8/1949 | Nelson | 312/71 |
| 2,500,437 | 3/1950 | Tandler et al. | 312/71 |
| 3,167,369 | 1/1965 | Haag | 312/71 |
| 3,724,715 | 4/1973 | Auriemma | 312/71 |
| 3,981,551 | 9/1976 | Miyazaki et al. | 312/71 |

Primary Examiner—Paul R. Gilliam
Attorney, Agent, or Firm—Lackenbach, Lilling & Siegel

[57] ABSTRACT

An automatic device for maintaining the level of a stack of plates, mainly of the storage-battery type, in feeding devices of automatic assembly machines, comprising, according to the invention, a stack-lifting mechanism in the form of a conventional pneumatic cylinder with its both chambers being connected through suitable conduits to a source of fluid under pressure; a replaceable magazine with a stack of plates mounted on said cylinder; and a control system for automatically maintaining the level of said stack of plates, which comprises throttles introduced in said conduits, a distributing valve with one member thereof having T-grooves on one of its end faces which connect said conduits to said source of compressed fluid, a stack-level sensing means in the form of a nozzle and baffle arrangement, said baffle being adapted to interact with the uppermost plate of the stack, and said nozzle being connected by its inlet through one of said conduits to one chamber of said cylinder, and another nozzle connected by its inlet through another conduit to the other chamber of said cylinder, so that said nozzles provide for simultaneous discharge therethrough of the compressed fluid from both chambers of said cylinder, as said baffle, associated with one of said nozzles, interacts with the uppermost plate of the stack, whereby the level of said stack of plates is automatically maintained.

1 Claim, 2 Drawing Figures

AUTOMATIC DEVICE FOR MAINTAINING THE LEVEL OF A STACK OF PLATES

The present invention relates to storage-battery manufacture, and more particularly to automatic devices for maintaining the level of a stack of battery plates in feeding devices of automatic assembly machines, such as automatic machines for packing battery plates into separation material, automatic machines for the assembly of battery cells, etc.

The present invention can be used in the process of manufacture of any product incorporating flat components for automatic assembly, packing and similar operations; such a device may be built into a mechanism for feeding workparts to the machine operative members to be treated, and also into a mechanism for stacking workparts (in magazines, for instance) after their treatment.

The invention can be especially effective for automatic assembly in making nickel-cadmium batteries with a high specific power capacity which makes use of especially thin electrode plates having low strength and rigidity, as those in batteries used in aircraft, electromobile, and other applications.

There are known in the prior art devices for piece-by-piece feeding of plates into assembly machines which are widely used in the manufacture of lead-acid batteries, but which are impracticable for assembly operations in making batteries with especially thin plates because of their small thickness and low strength. For this reason, many assembly operations in the production of batteries with a high specific power capacity are performed either manually or on semi-automatic machines where workparts are fed thereinto by hand and then processed automatically.

As far as known, there are no automatic feeders on machines for the assembly of thin fragile plates in making similar batteries abroad (for instance, in SAFT factories in France).

A piece-by-piece feeder for battery plates is disclosed in USSR Inventor's Certificate No. 358,739, which includes a magazine for accommodating a stack of plates therein and a gate-type mechanism mounted in the bottom part of the magazine which drives out one plate for each working stroke of the gate which has a reciprocating movement horizontally along with the lowermost plate of the stack. This feeder provides reliable operation only on plates which have a thickness of at least 1 mm with well-defined, straight and adequately strong edges.

For this reason, such a device cannot be used for thin fragile plates.

Known also is a feeder wherein thin plates are transferred from the upper level of the stack by the aid of vacuum holders, with means for automatically maintaining the level of the stack of plates in the magazines. Such a device (cf., for instance, "Automation of assembly processes", Lebedovsky et al., pp. 162-167, Lenizdat, USSR, 1970) has a mechanism for automatically maintaining the upper level of a stack of plates, including a rod whose upper end, provided with a work table, supports a stack of plates in a magazine, a spring which serves for lifting the rod together with the plates stack, and a brake lever retarding the upward movement of the rod and releasing it when pressed by a vacuum holder as this engages a plate in the magazine.

The holder is lowered into the magazine only to a predetermined level, acting upon the brake lever, which releases the rod while pressing the upper plate to said holder under the action of said spring.

Although it makes for increased production rates owing to a shorter travel of the holder for catching a plate, the aforesaid device suffers from considerable disadvantages. The use of a spring for lifting the stack within the magazine cannot provide constant pressure on the plates therein, which makes it cumbersome to employ sufficiently spacious magazines, especially in the case of thin and fragile plates. In addition, the use of a spring makes it difficult to load plates into magazines and to replace said magazines, because the compression of the spring for bringing it to the initial state for loading takes time and labor.

It is therefore an object of the present invention to eliminate the above-mentioned disadvantages of the known feeding devices.

Another object of the invention is to provide a simple and reliable automatic device for maintaining the level of a stack of battery plates, which allows the automation of assembly operations in manufacturing batteries with thin fragile plates and provides for increased productive output and higher reliability of the assembly machines.

The invention has as its aim the provision of a simple and reliable automatic device for maintaining the level of a stack of plates which allows automated assembly operations in making batteries with thin fragile plates, increased productive output and higher reliability of the assembly machines through the use of a pneumatic control system with a novel arrangement of elements thereof for automatically maintaining the level of a stack of plates.

This aim is attained by an automatic device, for maintaining the level of a stack of plates in feeding devices of automatic assembly machines, comprising a stack-lifting mechanism with a replaceable magazine mounted thereon and containing a stack of plates, and a control system for automatically maintaining said level in said magazine. According to the invention, said stack-lifting mechanism is a conventional pneumatic cylinder whose both chambers are connected by suitable conduits to a source of compressed fluid. The stack-level control system comprises conventional throttles, a distributing valve, nozzles, and a baffle associated with one of said nozzles, said conduits being connected to said source of compressed fluid through T-grooves made on one of the end faces of one member of said distributing valve, said throttles being placed in said conduits, said nozzles being connected by their inlets to said conduits between each of said throttles and the corresponding chamber of said pneumatic cylinder, so that compressed fluid is discharged through said nozzles to the atmosphere simultaneously from both chambers of said cylinder as said baffle interacts with its associated nozzle and the uppermost plate of the stack, whereby the required level of the stack of plates in said magazine is automatically maintained.

An automatic device for maintaining the level of a stack of plates according to the present invention provides for automated assembly operations in, for instance, the manufacture of nickelcadmium storage batteries of a high specific power capacity having especially thin and fragile plates, owing to the use of a pneumatic cylinder as a means for lifting the stack of plates, which prevents the plates from being subjected to any tangible distortions. The invention also increases the output of automatic assembly machines since the replacement of magazines in the feeding devices is speeded up by a corresponding rapid movement of the cylinder's piston rod effected through the provision of a distributing valve with T-grooves, and since the capacity of the magazines can be optimal without any limitations.

The use of a simple control system in the automatic device according to the invention, which is made in the form of two nozzles for the continuous discharge therethrough to the atmosphere of compressed fluid simultaneously from both chambers of the pneumatic cylinder, with at least one of said nozzles being provided with a baffle, provides high reliability of operation for the present device and for the automatic assembly machine as a whole.

Simple and reliable operation of an automatic device according to the present invention makes it suitable for use in the manufacture of any product incorporating flat components, specifically for automated assembly, packing, and other operations. The device can be built into feeding mechanisms or can be used for stacking the processed components.

The principle of the automatic operation actuating the movement of the cylinders piston rod described hereinafter can be used in many automatic systems for mechanical-movement control, thus ensuring fairly high accuracy by means of a simple device.

The invention will now be described in detail with reference to the accompanying drawings, wherein.

Figures 1, 2:
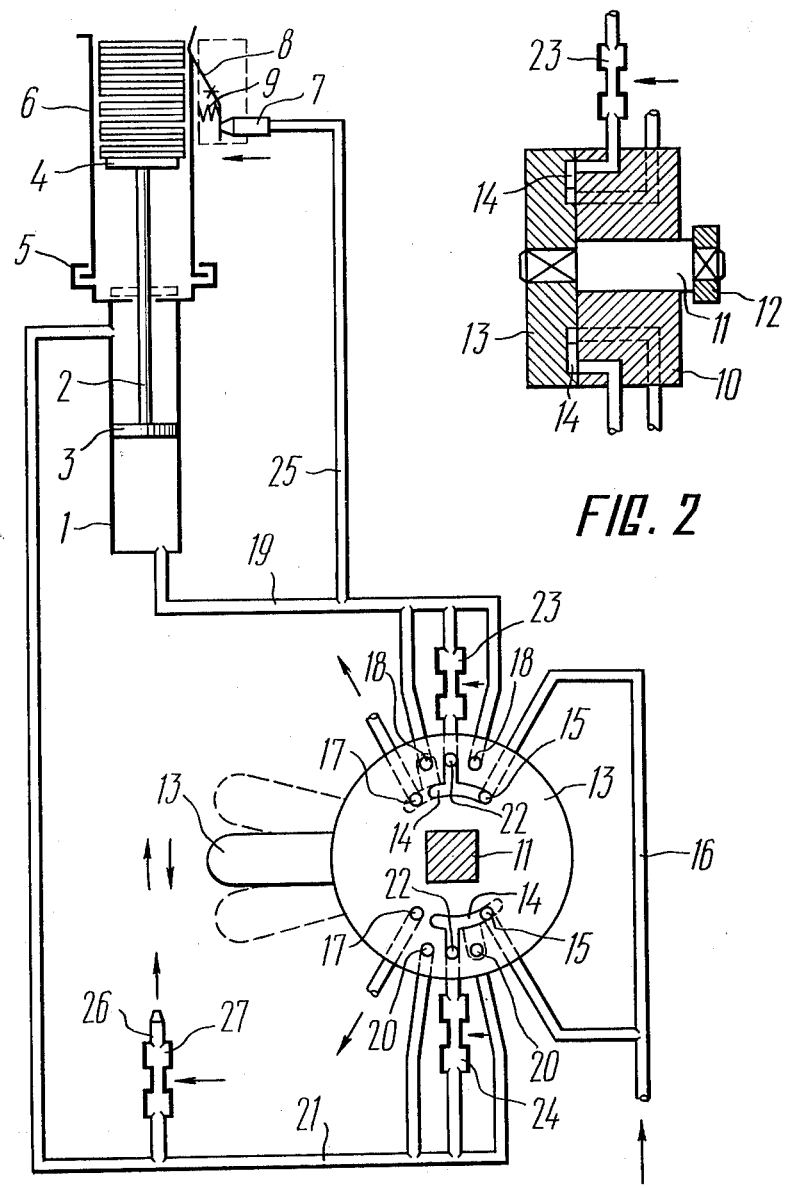
FIG. 1 is a schematic view of the construction of mechanisms and a pneumatic control circuit for the connection thereof in a device for automatically maintaining the level of a stack of plates.
FIG. 2 is a sectional view of the distributing valve.

The automatic device for maintaining the level of a stack of plates according to the present invention has a pneumatic cylinder 1 (FIG. 1) whose piston rod 2 carries a piston 3 on one end and a work table 4 on the other. Guides 5 for accommodating a replaceable magazines 6 with stacks of plates loaded therein are mounted on the upper face of the cylinder 1. Said cylinder 1, piston rod 2, piston 3, work table 4, and guides 5 make up a mechanism for lifting the stack of plates within a magazine 6.

Mounted in proximity to the upper part of the magazine 6 is a sensing device for checking the level of a stack of plates, which comprises a nozzle 7 and a baffle 8 in the form of a lever, one end of said baffle 8 rests on the nozzle's end face and is urged thereto by a spring 9. The other end of the baffle 8 (the lever) is adapted to engage the uppermost plate of the stack in said magazine 6.

A distributing valve, located near the cylinder 1, has a body 10 (FIG. 2), a shaft 11 mounted centrally therein and having squared portions on both ends, a handle 12 mounted on one of said squared portions of the shaft 11, and a member 13 (FIGS. 1 and 2) slidably mounted on the other of said squared portions so as to mate tightly with the associated face of the body 10. Two T-shaped grooves 14 with arched portions at the base are made on the end face of the member 13 adjoining the associated mating face of the body 10 which, in turn, has two rows of concentrically disposed bores. The bores are located so as to be in operational relation with said T-grooves 14 on the mating face of said member 15. In the row nearer the body center, there are provided two bores 15 connected through a conduit 16 to a source of compressed fluid and two bores 17 communicating with the atmosphere. In the row nearer the body periphery, there are provided two bores 18 connected through a conduit 19 to the bottom chamber of the cylinder 1, and two bores 20 connected through a conduit 21 to a top chamber of said cylinder 1. Two bores 22 are disposed between the bores 18 and the bores 20 at equal distances therefrom and are connected through throttles 23 and 24 with the conduits 19 and 21, respectively. The bores 18, 20 and 22 are adapted to be covered with the vertically extended portions of the T-grooves 14. The inlet of the nozzle 7 of the stack-level sensing device is connected through a conduit 25 to the conduit 19 at a point between the throttle 23 and the inlet to the bottom chamber of the cylinder 1. The size and configuration of both T-grooves 14 are such as to allow them to connect the bores 15 with the respective bores 22 in the intermediate position of the distributing valve 1, whereby fluid under pressure is simultaneously delivered to both cylinder chambers for automatic operation of the device.

When the handle 12 of the distributing valve is in its extreme (lower or upper) positions, the T-grooves 14 alternately connect the bores 18 and 20 either with the bores 17 or with the bores 15. The compressed fluid is then delivered either to the top or to the bottom chamber of the cylinder 1 by-passing the throttles 23 and 24 for rapid movement of the work table 4, which is done whenever the magazine 6 needs to be replaced.

The piston 3 of the cylinder 1 is brought to equilibrium by the adjustment of the flow through a nozzle 26 connected through a throttle 27 to the conduit 21 on any section between the throttle 24 and the top chamber of the cylinder 1.

The throttles 23, 24 and 27, the distributing valve with its member 13, and the stack-level sensing device in the form of the nozzle 7 with the baffle 8 constitute the control system for automatically maintaining the level of a stack of plates in the magazine 6.

The device according to the present invention operates as follows.

After its full assembly and installation, the device is connected to a source of compressed fluid by means of the conduit 16. The handle 12 of the distributing valve is shifted to its lower position for subsequent adjustment of the device. The work table 4 is thereby brought to its extreme lower position, the magazine 6 about halffull of plates is set in its place, whereupon the handle 12 is shifted to its intermediate position. With the nozzle 7 fully closed, the throttles 23 and 24 are adjusted so that the stack of the plates is imparted a slow and uniform movement upwards until the uppermost plate has engaged the baffle 8 and thus opens the nozzle 7 thereby establishing equal pressure in both chambers of the cylinder 1. The escape of the fluid through the nozzle 26 is set by adjusting the throttle 27 so as to bring to equilibrium the piston of the cylinder 1 with the nozzle 7 being half-open, whereupon further opening thereof causes the piston rod 2 of the cylinder 1 with the stack of plates to move downward. It should be noted that the throttle 27 is not indispensable to the circuit since the same effect can be produced by selecting an appropriate ratio between the cross-section areas of the nozzles 7 and 26. The device can also function with only one of the two adjustable throttles 23 or 24, but the introduction of all three throttles 23, 24 and 27 makes for easier regulation of the device within a wider range of operational speeds and loads of the piston rod 2 of the cylinder 1.

The stack-level sensing means containing the nozzle 7 and the baffle 8 may also have various embodiments.

What is essential, however, is that the movement of the piston rod 2 in either direction with reference to the point where the stack level is checked should change the opening of the nozzle 7 relative to its half-opening at which the equilibrium of the piston of the cylinder 1 is attained. Any embodiment of the distributing valve (with the member 13 styled as a cylindrical spool, tapered seat, etc.) should incorporate means for the simultaneous delivery of compressed fluid to both chambers of the cylinder 1 when the valve's handle 12 is brought in the intermediate position.

After the adjustment described above, the device operates automatically.

As the plates are either ejected from the magazine 6 (FIG. 1) or loaded therein after their processing, they act upon the baffle 8 changing the rate of escape of the compressed fluid from the nozzle 7. When this rate drops, the fluid pressure downstream of the throttle 23 in the conduits 19 and 25 and in the bottom chamber of the cylinder 1 mounts. The piston rod 2 then goes upwards thereby restoring its equilibrium through the action of the upper plate in the stack upon the baffle 8. If the rate of the fluid escape from the nozzle 7 increases, which may occur when the stack moves upwards (or the baffle 8 is displayed) at an excessive speed, the fluid pressure in the conduits 19 and 25 and in the bottom chamber of the cylinder 1 drops, and the piston rod 2 together with the stack of plates moves downwards. The equilibrium of the piston of the cylinder 1 is reached after several oscillations of the piston rod 2 with a fading amplitude. The period of the fading and the speed of the piston rod 2 at a given load (the weight of a fully loaded magazine) is set by adjusting the throttles 23 and 24.

When the magazine 6 has been emptied, it is replaced by a loaded one. For this, the handle 12 is shifted to the extreme lower position, the work table 4 is thereby brought to its lower position, the magazine 6 is pulled out of the guides 5, and a loaded magazine is set in place of the empty one. The handle 12 is shifted into the extreme upper position, whereupon the stack is lifted to engage the baffle 8, and the handle 12 is then shifted into the intermediate position. When the handle 12 is in its lower position, the lower T-groove 14 connects the right-hand bore 20 with the bore 15, which connection causes compressed fluid to go through the conduit 21 to the top chamber of the cylinder 1 by-passing the throttle 24, while the upper T-groove 14 connects the left-hand bore 18 with the bore 17 thereby communicating the conduit 19 and the bottom chamber of the cylinder 1 with the atmosphere. When the handle 12 is in its extreme upper position, the lower T-groove 14 places the left-hand bore 20, the conduit 21 and the upper chamber of the cylinder 1 in communication with the atmosphere, while the upper T-groove places the right-hand bore 18, the conduit 19, and the bottom chamber of the cylinder 1 in communication through the bore 15 with the compressed-fluid source. When the handle 12 is in its intermediate position, both bores 22 communicate with the bores 15 through both T-grooves 14, and compressed fluid flows through the throttles 23 and 24 simultaneously to both chambers of the cylinder 1 and also escapes through the nozzles 7 and 26 to the atmosphere. Here, the device again operates automatically.

The automatic device for maintaining the level of a stack of plates according to the present invention provides for automated assembly operations in making, for instance, nickel-cadmium storage batteries of a high specific power capacity having especially thin fragile plates, owing to the arrangement wherin the pneumatic cylinder 1 is used for lifting the plates in the magazine 6; both chambers of said cylinder are connected through the conduits 19 and 21 and throttles 23 and 24 with a source of compressed fluid, whereby said fluid is delivered to both chambers of said cylinder 1 and the equilibrium of the piston 3 within the cylinder 1 can be effected; and the nozzles 7 and 26 are respectively connected by their inlets to said conduits 19 and 21 on sections between the throttles 23 and 24 and the corresponding chambers of the cylinder 1, whereby the compressed fluid can be discharged to the atmosphere simultaneously from both chambers of the cylinder 1.

Such a connection of said elements in the device provides for a minimal pressure applied to the plates, while they are being held for feeding out, irrespective of the level of their stack in the magazine 6, whose capacity can be selected as optimal without any limitations.

The use of the distributing valve with a member 13 having T-grooves 14 makes possible quick replacement of magazines 6 owing to the rapid movement of the piston rod 2 in the cylinder 1 which is actuated merely by shifting the handle 12 of said distributing valve. This provides for an increased output of the assembly machine (the magazines 6 can be replaced on the run) and for its simple handling.

The use of a simple means for checking the level of a stack of plates in the form of the nozzle 7 with the baffle 8, said nozzle being connected to the respective conduit on a section between the throttle 23 and the associated chamber of the cylinder 1 so as to provide in combination with the nozzle 26 the discharge of compressed fluid to the atmosphere simultaneously from both chambers of cylinder 1, ensures high reliability of operation for the present device and the assembly machine as a whole.

What is claimed is:

1. An automatic device for maintaining the level of a stack of plates, mainly of the storage-battery type, in feeding devices of automatic assembly machines, comprising:

a source of fluid under pressure; a mechanism for lifting the stack made in the form of a conventional pneumatic cylinder with both chambers thereof communicating through conduits with said compressed-fluid source; a replaceable magazine with a stack of plates mounted on said cylinder; and a control system for maintaining the level of a stack of plates including a distributing valve having a member with T-grooves made on one of its end faces, said grooves placing said conduits in communication with said compressed-fluid source; throttles placed in said conduits; stack-level sensing means in the form of a nozzle and a baffle, said baffle being adapted to engage the uppermost plate of the stack in said replaceable magazine and said nozzle being connected by its inlet to one of said conduits and thereby to one chamber of said cylinder; another nozzle connected to another of said conduits and thereby connected to the other chamber of said cylinder, said nozzles thus providing for simultaneous discharge therethrough of the compressed fluid from both chambers of said cylinder to the atmosphere, as said baffle, associating with one of said nozzles, interacts with the uppermost plate of the stack, the level of said stack in said replaceable magazine being thereby automatically maintained.

* * * * *